Patented May 22, 1951

UNITED STATES PATENT OFFICE 2,554,088

EXTRACTION OF GARLIC

Chester J. Cavallito, Rensselaer, N. Y., assignor, by mesne assignments, to Winthrop-Stearns Inc., New York, N. Y., a corporation of Delaware No Drawing. Application August 30, 1944,
Serial No. 552,007

2 Claims. (Cl. 260—456)

This invention relates to an antibiotic substance and to a process for obtaining it from garlic cloves.

While the antibiotic activity of extracts of *Allium sativum*, the common garlic, has been recognized by many investigators, no substance of high antibiotic activity has hitherto been obtained from this plant. The activity has been variously attributed to: allyl sulfide; unstable sulfur in alkyl polysulfides; a bacteriophage; acrolein or other unsaturated aldehyde; and, more recently, to a chemically undefined group of substances designated as phytoncides. Semmler [Archiv der Pharmazie, 230, 434 (1893)] subjected to fractional distillation at 16 mm. a preparation of oil of garlic obtained by steam distillation of the crushed cloves, and found allyl disulfide, allyl propyl disulfide, and allyl polysulfides in the fractions thus obtained. He did not, however, show that any of these substances have antibiotic activity nor did he obtain any compound responding in properties to the antibiotic substance which will be described hereinafter.

I have now discovered a process for treating garlic cloves in such a manner as to yield an antibiotic substance to which I have assigned the name allyl disulfide oxide. This compound exhibits high antibacterial activity toward both gram-positive and gram-negative organisms.

My invention can be carried out by treating ground garlic cloves with a volatile water-miscible organic solvent, such as methyl alcohol, ethyl alcohol or acetone, separating the polysaccharides and other interfering substances thus precipitated, and isolating the allyl disulfide oxide from the filtrate. For this isolation the organic solvent is removed below 50° C., for instance, by distillation at reduced pressure, and the allyl disulfide oxide is removed from the residue by a reduced pressure distillation in steam. The pure antibiotic substance can be obtained from the aqueous distillate by solvent extraction, removing the solvent at reduced pressure, dissolving the residue in water, separating any insoluble material, extracting the aqueous solution with ethyl ether, and obtaining the antibiotic substance as a residue on removal of the ethyl ether by distillation at reduced pressure.

All distillations involved in my process should be conducted below 50° C. since allyl disulfide oxide is appreciably decomposed at temperatures above 50° C. Such instability of this substance has probably been an important factor in the failure of previous investigators to obtain it from garlic.

In order to distinguish my new product from the substances to which the antibacterial activity of garlic extracts has been previously ascribed, there were tested by the cylinder plate method (Abraham et al., Lancet, 241 (2), 177 (1941)) natural allyl disulfide and allyl polysulfides obtained by the method of Semmler (loc. cit.) and synthetic allyl sulfide. None of these compounds show any significant antibacterial action. The antibacterial activity of garlic furthermore cannot be attributed to acrolein or crotonaldehyde, for aqueous solutions of these substances, when tested by the cylinder plate method, show a diffuse reaction without defined zones of inhibition. In contradistinction, allyl disulfide oxide, when tested under the same conditions, shows a sharp zone of inhibition with the periphery accentuated by a line of heavy growth.

Allyl disulfide oxide is bacteriostatic and bactericidal with the former type of action predominating. The substance is about equally effective against gram-positive and gram-negative organisms; this is in contrast with penicillin, which is practically ineffective against gram-negative organisms. By the cylinder plate method against *Staphylococcus aureus*, allyl disulfide oxide shows an activity equivalent to about 15 Oxford penicillin units per milligram, or about 400 times the activity of the ground garlic cloves. As examples of the organisms which are inhibited by allyl disulfide oxide, there may be mentioned *Staph. aureus, Strep. hemolyticus, Strep. viridans, B. subtilis, B. typhosus*, the A, B, and Kunzendorf strains of *B. paratyphosus, B. morgani, B. enteriditis, B. typhi murium*, the Shiga, Flexner and Sonne strains of *B. dysenterae*, and *V. cholerae*.

While the exact structure of allyl disulfide oxide is not known with certainty, the possibilities for its structure are restricted rather narrowly by the physical and chemical data. The molecular weight and the analytical data show that it has the molecular formula $C_6H_{10}OS_2$, corresponding to a molecular weight of 162. Alkaline hydrolyis of the compound yields sulfur dioxide and some allyl disulfide. An aqueous solution of one mole of the compound reacts rapidly with cysteine at pH 6 to yield two moles of

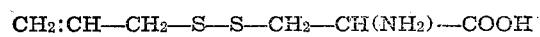
$$CH_2{:}CH{-}CH_2{-}S{-}S{-}CH_2{-}CH(NH_2){-}COOH$$

These data show that there are two allyl groups attached to different sulfur atoms in the molecule.

The above data restrict the structure of allyl disulfide oxide to the formulation

The structure of the $(S_2O)$ group is uncertain, the structure of the compound being probably either

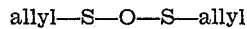
allyl—S—O—S—allyl or, more likely,

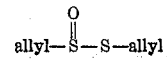

Alone or in its non-alkaline aqueous or non-aqueous solutions, allyl disulfide oxide undergoes a chemical change on standing at room temperature, yielding an antibiotically inactive viscous liquid. Since allyl disulfide oxide can be obtained from garlic which has been stored for from several months to a year, the form in which the compound exists in the garlic is doubtful, but it appears unlikely that it occurs unbound in the plant. By storing allyl disulfide oxide or its aqueous solution in Dry Ice, the antibiotic activity may be preserved for a month or longer. The presence of hydrogen peroxide aids in stabilizing allyl disulfide oxide against deterioration.

The invention can be carried out in the following manner without being restricted to the precise details thereof:

To 4 kilograms of ground garlic cloves 5 liters of 95% ethyl alcohol are added and the mixture is stirred for thirty minutes. The precipitate which forms on addition of the alcohol is separated from the solution by filtration. The filtrate consists of about 5200 ml. of solution which contains about 2.5–4 mg. of allyl disulfide oxide per ml. This filtrate is distilled under reduced pressure (15–20 mm.) until most of the alcohol is removed, the alcoholic distillate being discarded. The distillation is continued at 10–15 mm. pressure, the volume of liquid in the distillation flask being maintained at about 500 ml. by addition of water from a dropping funnel. The distillation is continued until the residue contains less than ten Oxford penicillin units of allyl disulfide oxide per ml.

The aqueous distillate, which has a volume of about 9 liters, is divided into three equal portions. Each portion is extracted once with 500 ml. of ethyl ether and then four times with 300 ml. portions of ethyl ether. All of the ether extracts are combined and the ether is removed by distillation under reduced pressure. The residue consists of an oil and some water; this mixture is shaken thoroughly with about 250 ml. of water and 10 ml. of petroleum ether. The layer of petroleum ether is separated and discarded and the aqueous layer is then filtered. If desired, this aqueous filtrate, which contains the allyl disulfide oxide, can be frozen and stored in Dry Ice until needed for the isolation procedure.

The pure allyl disulfide oxide is isolated from the aqueous concentrate in the following manner. The solution is extracted four times, each time with one-fifth its volume of ether, and the combined ether extracts are cooled in a Dry Ice bath. The ice crystals which form are removed by filtration. The ether is then removed from the filtrate under reduced pressure and the residual oil is dried in vacuo at room temperature for thirty minutes. The allyl disulfide oxide thus obtained weighs approximately 6 g. It is a colorless liquid with a pungent odor and cannot be distilled alone without decomposition. Anlysis of the liquid shows approximately 44.35% carbon, 6.32% hydrogen, and 40.30% sulfur. A cryoscopic determination of the molecular weight in benzene gives a value of about 167. It has $d^{20}$ 1.112 and $n_D^{20}$ 1.561, and it is optically inactive. It has a water solubility of approximately 2.5% at 10° C., is miscible with alcohol, benzene and ether, and is fairly insoluble in petroleum ether.

Like penicillin and some other antibiotic substances, allyl disulfide oxide is inactivated by cysteine. To a solution of 452 mg. of allyl disulfide oxide in 40 ml. of water 2 g. of cysteine hydrochloride and enough sodium bicarbonate to raise the pH to 6 are added. In a few seconds, a white crystalline precipitate appears and a mercaptan odor is perceptible. After the mixture has stood for twenty minutes, the precipitate is collected on a filter, washed with water, then with ether and is then dried and weighed. The solid reaction product weighs about 1.01 g. To purify the crystals, they are dissolved in dilute hydrochloric acid solution, the solution is extracted with ether, and the product is recovered from the aqueous phase by slowly raising the pH to 6, whereupon the purified reaction product is deposited. The decomposition point of the pure compound is approximately 180–185° C. Its analytical data (37.25% carbon, 5.51% hydrogen, 7.66% nitrogen, and 33.3% sulfur), its behavior as an amino acid, and its method of formation indicate it to be $$CH_2{:}CH{-}CH_2{-}S{-}S{-}CH_2{-}CH(NH_2){-}COOH$$

I claim:

1. The process for obtaining allyl disulfide oxide from *Allium sativum* which comprises extracting the cloves with a volatile, water-miscible organic solvent, removing the organic solvent from the extract below 50° C., co-distilling the residue at reduced pressure with water below 50° C., extracting the allyl disulfide oxide from the distillate with ethyl ether, and removing the ethyl ether from the allyl disulfide oxide by distillation.

2. The process for obtaining allyl disulfide oxide from *Allium sativum* which comprises extracting the cloves with ethyl alcohol, removing the ethyl alcohol from the extract below 50° C., co-distilling the residue at reduced pressure with water below 50° C., extracting the allyl disulfide oxide from the distillate with ethyl ether and removing the ethyl ether from the allyl disulfide oxide by distillation.

CHESTER J. CAVALLITO.

REFERENCES CITED

The following references are of record in the file of this patent:

FOREIGN PATENTS

| Number | Country | Date |
| --- | --- | --- |
| 345,600 | Great Britain | Feb. 5, 1930 |
| 432,053 | Germany | July 23, 1926 |
| 77,938 | Austria | Dec. 15, 1918 |

OTHER REFERENCES

"Pharmazeutische Zeitung," vol. 81, page 440.

"Proceedings of Indian Academy of Sciences," vol. 13B, pp. 129–30.

"Proceedings of Soc. for Experimental Biology and Medicine," Vollrath et al., vol. 36, pp. 55–58.

Glaser et al.: "Archiv für Exp. Path. und Pharm.," vol. 193 (1939), pp. 1–9.

Lehmann: "Archiv für Exp. Path. und Pharm.," vol. 147 (1930), pp. 245–264.

Pharmazeutische Zentrallhalle," vol. 74 (1933), page 408.

Vollrath et al.: "Proceedings of the Society for Experimental Biology and Medicine," vol. 36, pages 55–56 (1937).

Cavallito et al.: "Journal of the American Chemical Society," vol. 66, pages 1950–51 (1944).

Cavallito et al.: "Journal of the American Chemical Society," vol. 66, pages 1952–54 (1944).

Cavallito et al.: "Journal of the American Chemical Society," vol. 67, pages 1032–33 (1945).

Small et al.: "Journal of the American Chemical Society," vol. 69, pages 1710–13 (1947).